J. B. NEWBROUGH.
Counting Machine.
No. 24,481. Patented June 21, 1859.
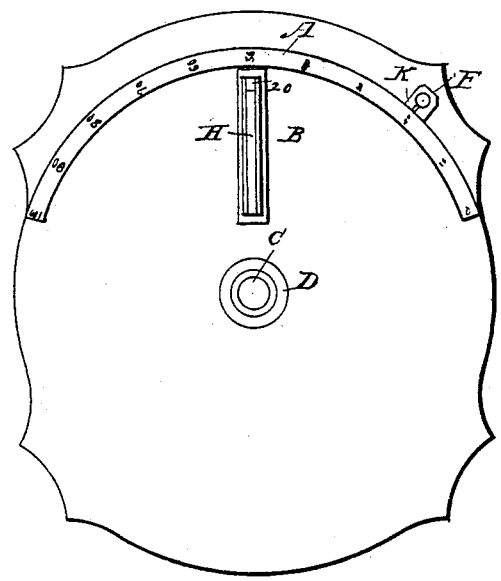
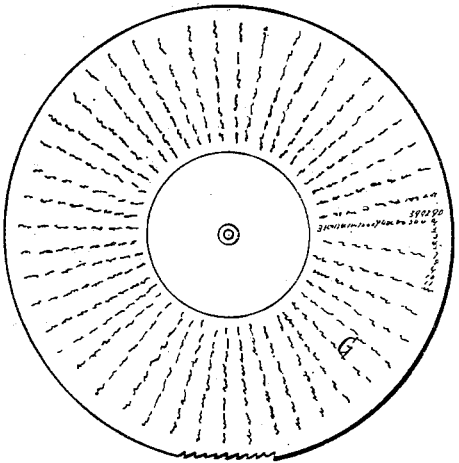
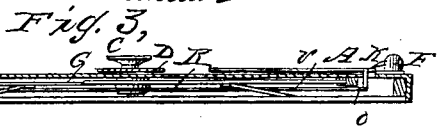
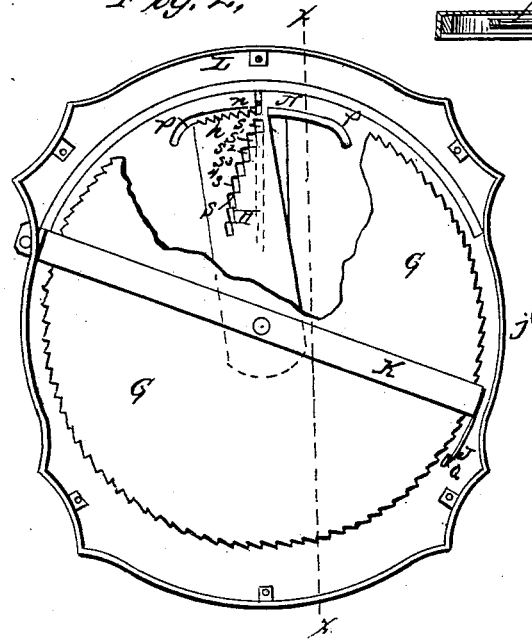
WITNESSES:
INVENTOR:

UNITED STATES PATENT OFFICE.

JOHN B. NEWBROUGH, OF ST. LOUIS, MISSOURI.

INSTRUMENT FOR ADDING NUMBERS.

Specification of Letters Patent No. 24,481, dated June 21, 1859.

*To all whom it may concern:*

Be it known that I, JOHN B. NEWBROUGH, of the city of St. Louis, State of Missouri, have invented a new and useful Improvement in Counting-Machines; and I do hereby declare the following to be a full and exact description of the same, reference being had to the accompanying drawings, making part of this specification.

The said improvement relates first, to a peculiar construction and adaptation of the arm by which the dial is moved. Second, to devices for throwing the parts out of gear for setting the machine. Third, to devices for shifting the obstructing plate and retaining the parts in correct relative position.

In the accompanying drawings Figure 1, is a plan of the machine. Fig. 2, is an underside view with the bottom plate and a portion of the dial removed. Fig. 3, is a vertical section at $x$ $x$ Fig. 2, with the pointer at 50. Fig. 4 is a face view of the dial. Fig. 5 is an elevation of the pointer.

A is a segmental scale which in the illustration here given constitutes an arc of 120 degrees from the figures 0 to 99 inclusive.

G is a dial pivoted concentrically with the scale A and marked with a series of numbers in concentric circles, each circle containing 300 numbers which therefore correspond in distance, with the numbers of the scale A. The periphery of the dial is furnished with ratchet teeth precisely corresponding in number with the numbers on the dial.

B is an aperture in the case, through which the figures on the dial may be seen as hereinafter explained.

H is an "obstructing plate," pivoted concentrically with and above the dial G and furnished on its periphery with a series of teeth $h$, by which the plate is shifted at each revolution of the dial.

S $S^1$ $S^2$ &c. are radial apertures in the plate H, corresponding in number and position with the teeth $h$. These slots approach successively nearer and nearer the center of motion in order to coincide with successive circles of figures on the dial as will be understood when the operation of the machine is explained.

K is an arm pivoted concentrically beneath the dial G and provided at one end with a spring pawl $j$ adapted to engage with the ratchet teeth on the periphery of the dial, and at the other end bent so as to pass upward through a segmental slot L, to the exterior of the machine, where it is provided with a knob F for prehension, and a pointer $k$ to indicate upon the scale A the position of the lever.

$i$ is a spring catch operating both as a feed hand to shift the obstructing plate H, and as a detent to arrest the backward motion of the dial, in setting the machine, as will be hereinafter explained.

N, is a segmental rib cast upon the under surface of the face plate of the machine and serving to hold the obstructing plate in a proper position and also to elevate the catch $i$ so as to prevent it from engaging with the teeth $h$ excepting at the proper period. $n$ is a cavity or depression in the said rib into which the catch descends in its passage so as to engage with one of the teeth $h$ and shift the plate the distance of a tooth at each revolution of the dial.

$p$ $p$ are pins near each extremity of the rib N, which limit the play of the obstructing plate and also prevent the dial coming in contact therewith. Pins $p'$ projecting downward from the interior of the case and coming in contact with the dial near its periphery serve also to hold it in a correct position and prevent the defacement of its figures.

$o$ is a hook supporting the edge of the dial immediately beneath the aperture B, so as to keep that portion of the dial in close proximity with the obstructing plate to facilitate reading the figures.

Q is a stud upon which the pawl $j$ rises when the arm K is retracted to the position shown in Fig. 2, in order to reverse the dial to set it.

C and D are knobs attached respectively to the shafts of the dial and obstructing plate for the purpose of turning them back in order to set the machine.

$v$, $v$, are springs attached to the bottom plate or board, and pressing upward against the dial to hold it in position and by their friction against its surface prevent its too free motion in either direction.

Operation: When it is desired to set the machine the arm K is retracted to the position seen in Fig. 2 bringing the pointer $k$ a short distance back of the figure 0 on the scale A and elevating the pawl $j$ upon the stud Q so that it ceases to engage with the teeth on the periphery of the dial. The obstructing plate H is then to be placed in its rearmost position (as indicated in Figs. 1 and 2) and the dial rotated backward until the figure 0, is exposed to view through the aperture s, at which instant the catch i passing into the cavity n, engages with the foremost tooth upon the plate H (which tooth is made square for this purpose) and prevents the further motion of the dial in that direction. The machine is now ready for operation and upon the arm K being moved forward the pawl j descends from the stud Q and engages with a tooth upon the dial the instant that the pointer reaches the figure "0." The continued motion of the arm therefore carries the dial with it and exposes through the aperture s a corresponding number to any at which the pointer k may be placed. The arm is then retracted to "0" without imparting motion to the dial and upon a second forward motion of the arm the dial is again carried with it as far as it may be moved so as to add the number now indicated by the pointer to that previously indicated and expose the sum of the two through the aperture s. This process is repeated until the dial approaches the completion of a circuit at which period, the catch i, having previously risen on the oblique end of the rib N, descends into the cavity n and at the instant the figure 299 passes under the aperture s engages with the front tooth upon the plate H so as to carry the said plate with it the distance of one tooth, bringing the second aperture s' into coincidence with the slot B, and exposing through it the number "300"—being the first in the second circle. At this time the catch i, passing out of the cavity n, releases the tooth with which it had engaged, so that the plate H is again left at rest, while the continued motion of the dial exposes the successive numbers "301," "302," "303" &c. through the aperture s', until a second revolution being completed the catch i engages with the second tooth on the plate H in the manner before described and moves the said plate so as to bring the aperture $s^2$ into coincidence with the slot B and expose through it the third circle of figures commencing with "600."

The following is what I claim as new and of my invention herein and desire to secure by Letters Patent.

1. The bent arm K underlying the dial G. so as to operate it without obstructing the vision.

2. The stud Q operating in the described connection with the pawl j to permit the backward motion of the dial for the purpose set forth.

3. The combination and arrangement substantially as set forth of the rib N, cavity n, catch i and teeth h operating as explained to shift the obstructing plate at each revolution of the dial and arrest the reverse motion of the latter at the right instant in setting the machine.

4. The described arrangement and combination of the pins p p and hook o, operating in the manner and for the purposes set forth.

In testimony of which invention, I hereunto set my hand.

J. B. NEWBROUGH.

Witnesses:
OTIS KNIGHT,
EDM. F. BROWN.